UNITED STATES PATENT OFFICE.

THEODORE ALBRECHT, OF ROYAL OAK, ROBERT PERETTO, OF FARMINGTON, AND JOHN F. WANDERSEE, OF HIGHLAND PARK, MICHIGAN, ASSIGNORS TO FORD MOTOR COMPANY OF DELAWARE, OF HIGHLAND PARK, MICHIGAN, A CORPORATION OF DELAWARE.

METAL ALLOY.

1,376,062.      Specification of Letters Patent.      Patented Apr. 26, 1921.

No Drawing. Original application filed September 10, 1919, Serial No. 322,865. Divided and this application filed June 7, 1920. Serial No. 386,971.

*To all whom it may concern:*

Be it known that we, THEODORE A. L. ALBRECHT, ROBERT PERETTO, and JOHN F. WANDERSEE, citizens of the United States of America, residing at Royal Oak, Oakland county, Farmington, Oakland county, and Highland Park, Wayne county, respectively, and State of Michigan, have invented a certain new and useful Improvement in Metal Alloys, of which the following is a specification.

Our invention relates to a metal alloy such as that described in our application for Patent filed Sept. 10, 1919, Serial Number 322,865, of which this is a divisional application, and which is particularly applicable for use in the production or manufacture of cutting or forming implements or tools requiring any or all of the qualities of toughness, hardness and ductility, and being especially capable of withstanding the requirements necessary in cutting tools or instruments used on lathes, or milling cutters, which are operated at great speed, or in forming implements which are under great pressure.

One object of our invention is to produce an alloy which is of such hardness as to be capable of cutting or forming hard substances, and especially of cutting such hard substances while being operated at great speed, but which at the same time has the qualities of toughness, and ductility which will resist breakage and will not easily wear when in use for such purpose of cutting hard substances, and especially when being operated at a high speed, and will also resist breakage when under great pressure.

A further object of our invention is to provide a metal alloy which can be graduated in toughness to make it best suited for the work which it is to perform. In this connection it may be mentioned that our alloy is especially adapted for cutting tools which are subjected to sudden impacts which tend to shatter them if brittle, to heat from friction which tends to soften them, and to considerable wear when cutting, whereby they must be reshaped from time to time. They must also be formed from metal which may be formed into the shape suitable for any particular kind of work which is to be done, so that both on account of the original forming of the tool and the reshaping after it has been used, it is desirable that the material be ductile so that it may be worked into shape with a minimum amount of labor. On the other hand, if the material is too easily worked, it gives away under the wear and strain of the work. Our alloy may be graduated so that the material will be hard enough to secure a maximum amount of work therefrom and yet may be made as ductile as is consistent with the necessary hardness. We accomplish this graduating of the relative hardness and ductility of the material by changing the proportion of iron therein.

Our alloy makes an excellent lathe tool. For cutting 1.10 carbon steel on a hand fed lathe, we believe 788 revolutions per minute, or a little more, to be the most efficient speed, although it is possible to reach a maximum speed of more than twice that number. A cutting tool of our alloy will withstand this use longer than any other alloy we have used, and, we believe, longer than any cutting tool used commercially.

Also a cutting tool made from our alloy will take a high luster and does not corrode when exposed to the air or elements; the fumes of a chemical laboratory do not affect it.

We are aware that other alloys and high speed tools of various compositions have been used for these purposes, but the weakness of these metals lies in the fact that they are either so hard as to be brittle, and easily broken when placed in use as a high speed cutting tool; too soft to withstand great pressure and wear required of them in such use; or are not ductile.

A metal such as ours is hard enough to cut glass or steel; tough enough to withstand a blow from a hammer, and ductile enough to bend slightly from the same blow of the hammer.

For melting, graphite crucibles may be used for the reason that it will absorb a small percentage of carbon therefrom. It is, of course, not essential that graphite crucibles be used, but the percentage of carbon should be substantially as hereinafter set forth.

As the main constituents of our alloy we prefer carbon, chromium, tungsten and cobalt. The presence of iron in an amount graduated up to fifteen per cent., together with these constituents, will also make an excellent alloy for the production of such tools as herein specified.

It is not a requirement of our alloy that all of these metals be entirely, or even substantially pure. It is possible to use ferrochromium which will contain about seventy to eighty per cent. chromium and the other twenty or thirty per cent. being almost entirely iron, the exception being a small percentage of carbon. For this reason our alloy will contain more or less iron. We have obtained good results from the use of powdered tungsten, approximately ninety-eight per cent. pure, and cobalt ninety-seven per cent. pure.

It is understood that in the use of such metals not entirely pure, small percentages of other metals will appear in the alloy. This will be noted in the analysis hereinafter quoted in which these small quantities of other metals will appear, while only the metals carbon, chromium, cobalt, and tungsten were used, the small percentage of other metal being in and coming from such original constituents of the alloy.

We wish it to be understood, however, that pure, or substantially pure carbon, chromium, cobalt and tungsten, with the addition of iron, from two to fifteen per cent. iron, if desired, may be used with practically as good effect as those containing a small amount of other metals or impurities.

A chemical analysis of two of our experiments which produced an alloy of the properties contained in our invention showed the following constituents in their relative proportions:

*No. 1.*

| | |
|---|---|
| Carbon | 2.54% |
| Chromium | 29.31 |
| Tungsten | 10.98 |
| Iron | 3.38 |
| Silicon | 1.34 |
| Cobalt | 50.67 |
| Nickel | .16 |

*No. 2.*

| | |
|---|---|
| Carbon | 2.04% |
| Chromium | 26.06 |
| Tungsten | 11.86 |
| Iron | 11.64 |
| Silicon | .22 |
| Cobalt | 47.31 |
| Aluminum | Trace. |

Both of these alloys are within our invention and make excellent alloys for cutting, milling and forming implements and tools such as hereinbefore described.

It is to be understood that these proportions may be varied to meet special requirements, as by varying the iron constituent for securing greater or less ductility.

We wish it to be understood that other metals of the chromium group may be used in the place of tungsten in the compounding of our alloy. By other members of the chromium group, we mean either molybdenum or uranium.

We claim as our invention:

1. Metal alloy composed of chromium from twenty to thirty-five per cent., tungsten from five to twenty per cent., iron from one to fifteen per cent., cobalt and carbon.

2. Metal alloy composed of carbon two to five per cent., cobalt thirty-five to sixty-five per cent., iron one to fifteen per cent., chromium and tungsten.

3. Metal alloy composed of chromium fifteen to forty per cent., cobalt thirty-five to sixty-five per cent., iron one to fifteen per cent., tungsten and carbon.

4. Metal alloy composed of chromium from twenty to thirty-five per cent., tungsten from five to twenty per cent., cobalt forty to sixty per cent., carbon from two to five per cent., and iron from one to fifteen per cent.

5. Metal alloy composed of chromium from twenty to thirty-five per cent., tungsten from five to twenty per cent., cobalt forty to sixty per cent., iron from one to fifteen per cent., and carbon more than one per cent.

6. Metal alloy composed of chromium from twenty to thirty-five per cent., tungsten from five to twenty per cent., cobalt forty to sixty per cent., carbon from two to five per cent., and iron less than fifteen per cent.

7. Metal alloy composed of chromium from twenty to thirty-five per cent.; another member of the chromium group five to twenty per cent., iron from trace to fifteen per cent., cobalt and carbon, said alloy being substantially free from other metals contained as impurities in the ingredients.

8. Metal alloy composed of chromium from twenty to thirty-five per cent.; another member of the chromium group five to twenty per cent., iron from trace to fifteen per cent., cobalt and carbon.

9. Metal alloy composed of 2.54% carbon, 29.31% chromium, 10.98% tungsten, 3.38% iron, 1.34% silicon, 50.67% cobalt, and .16% nickel.

10. Metal alloy composed of 2.54% carbon, 29.31% chromium, 10.98% tungsten, 3.38% iron, 50.67% cobalt.

11. Metal alloy composed of 2.04% carbon, 26.06% chromium, 11.86% tungsten, 11.64% iron, 47.31% cobalt.

THEODORE ALBRECHT.
ROBERT PERETTO.
JOHN F. WANDERSEE.